Figure 1:
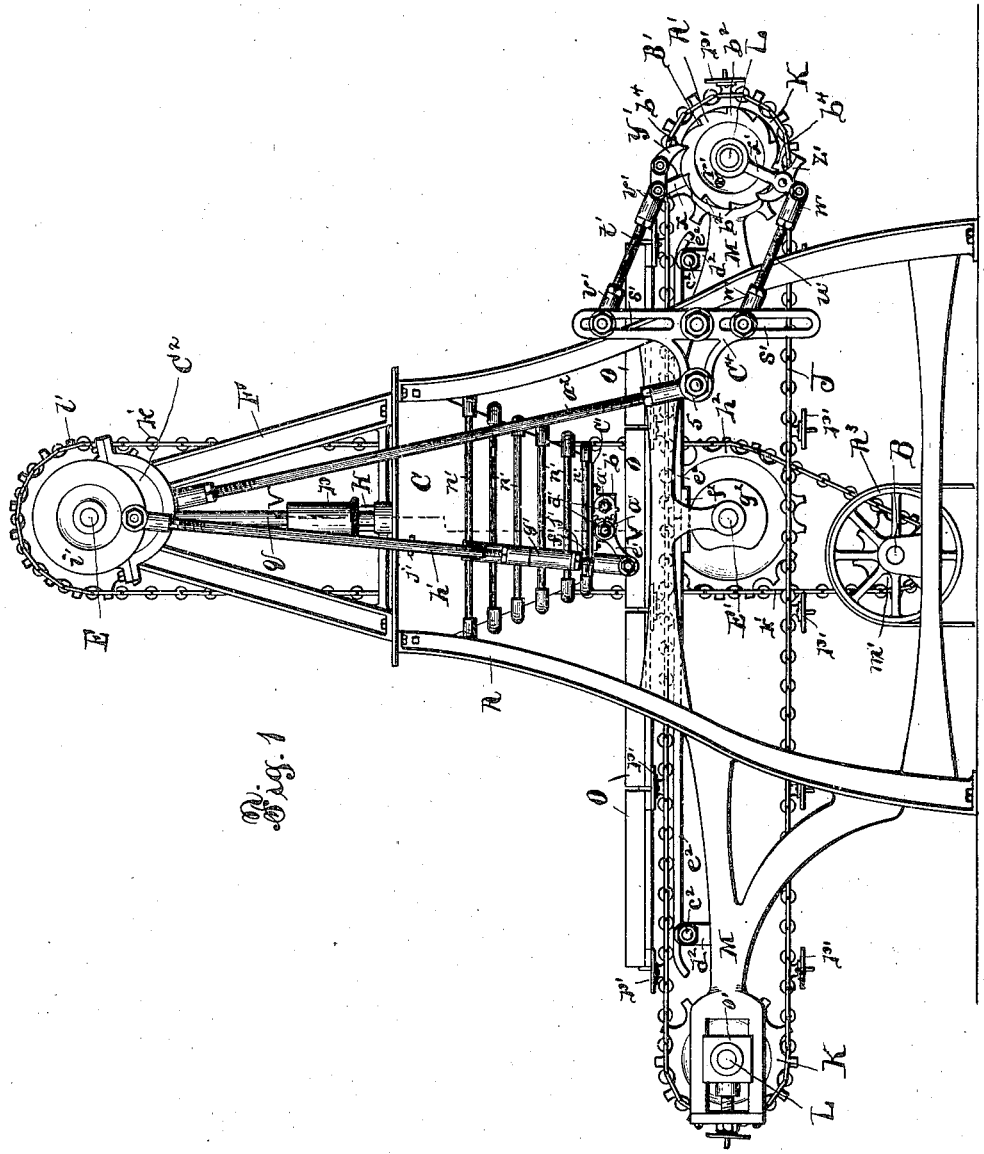

No. 655,918. Patented Aug. 14, 1900.
J. C. WALIER.
MACHINE FOR MOLDING CONFECTIONS.
(Application filed Jan. 27, 1899. Renewed June 28, 1900.)
(No Model.) 9 Sheets—Sheet 1.

WITNESSES:

INVENTOR
Joseph C. Walier
By E. Laass
his ATTORNEY

No. 655,918. Patented Aug. 14, 1900.
J. C. WALIER.
MACHINE FOR MOLDING CONFECTIONS.
(Application filed Jan. 27, 1899. Renewed June 28, 1900.)
(No Model.) 9 Sheets—Sheet 2.
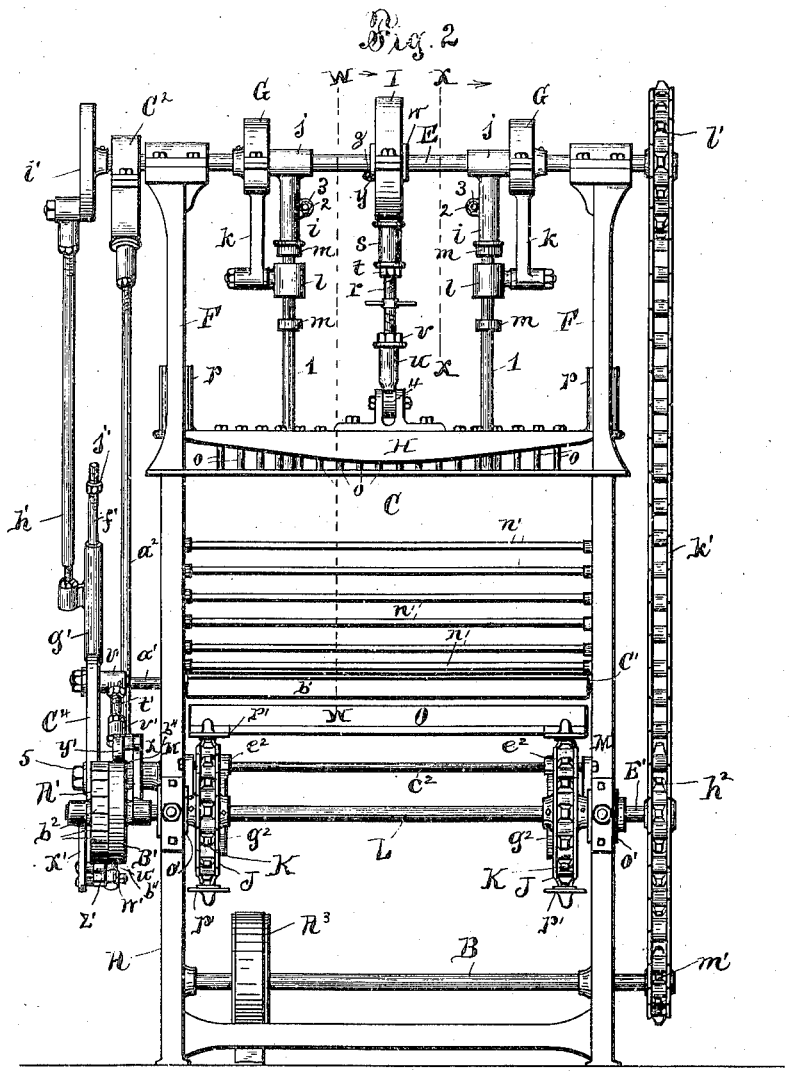
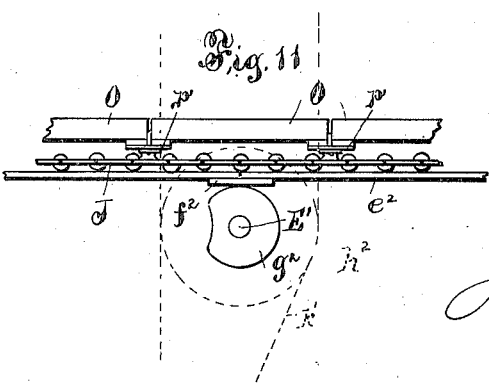
WITNESSES:
INVENTOR
ATTORNEY No. 655,918. Patented Aug. 14, 1900.
J. C. WALIER.
MACHINE FOR MOLDING CONFECTIONS.
(Application filed Jan. 27, 1899. Renewed June 28, 1900.)

(No Model.) 9 Sheets—Sheet 3.

WITNESSES:

INVENTOR
Joseph C. Walier
By E. Laass
his ATTORNEY

No. 655,918. Patented Aug. 14, 1900.
J. C. WALIER.
MACHINE FOR MOLDING CONFECTIONS.
(Application filed Jan. 27, 1899. Renewed June 28, 1900.)
(No Model.) 9 Sheets—Sheet 4.

WITNESSES:
J. J. Laass
H. B. Smith

INVENTOR
Joseph C. Walier
By E. Laass
his ATTORNEY

No. 655,918. Patented Aug. 14, 1900.
J. C. WALIER.
MACHINE FOR MOLDING CONFECTIONS.
(Application filed Jan. 27, 1899. Renewed June 28, 1900.)

(No Model.) 9 Sheets—Sheet 5.

WITNESSES:
INVENTOR
his ATTORNEY

No. 655,918. Patented Aug. 14, 1900.
J. C. WALIER.
MACHINE FOR MOLDING CONFECTIONS.
(Application filed Jan. 27, 1899. Renewed June 28, 1900.)
(No Model.) 9 Sheets—Sheet 6.
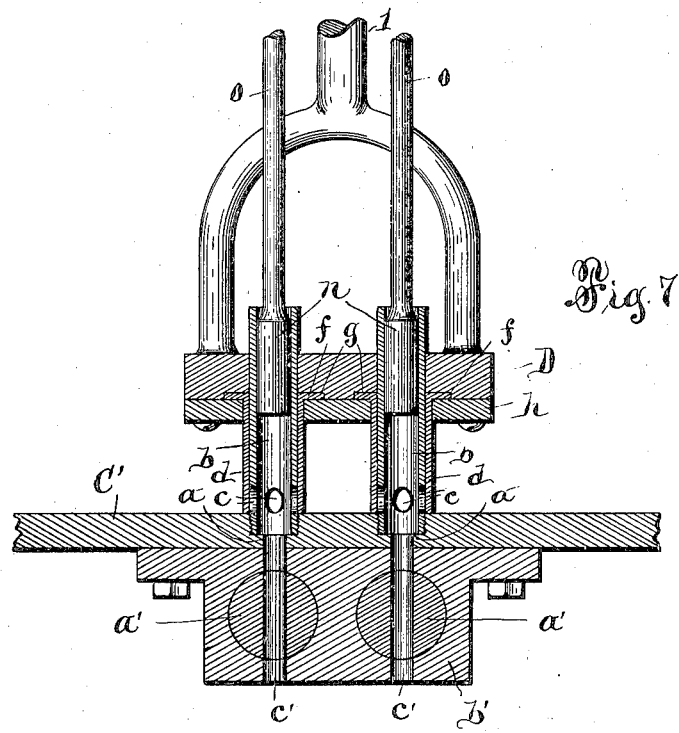
WITNESSES:
INVENTOR No. 655,918. Patented Aug. 14, 1900.
J. C. WALIER.
MACHINE FOR MOLDING CONFECTIONS.
(Application filed Jan. 27, 1899. Renewed June 28, 1900.)
(No Model.) 9 Sheets—Sheet 7.
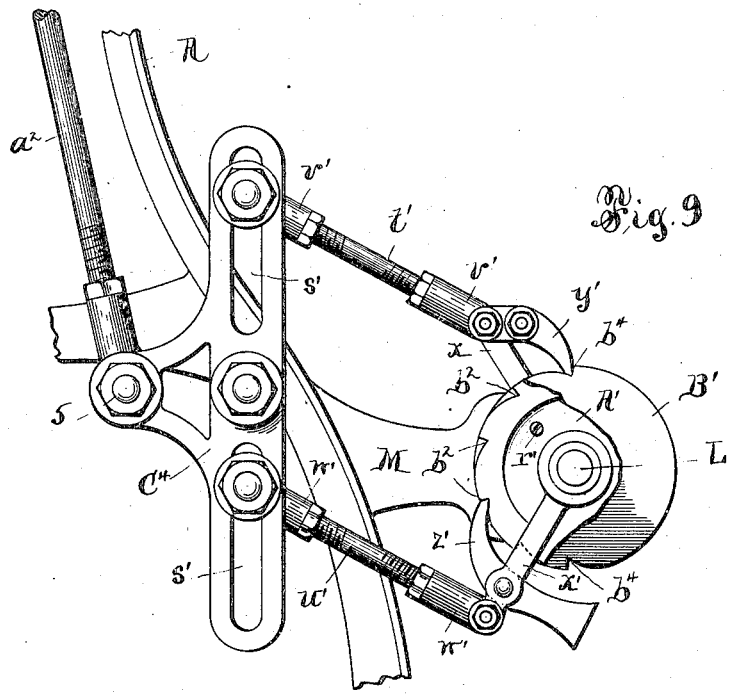
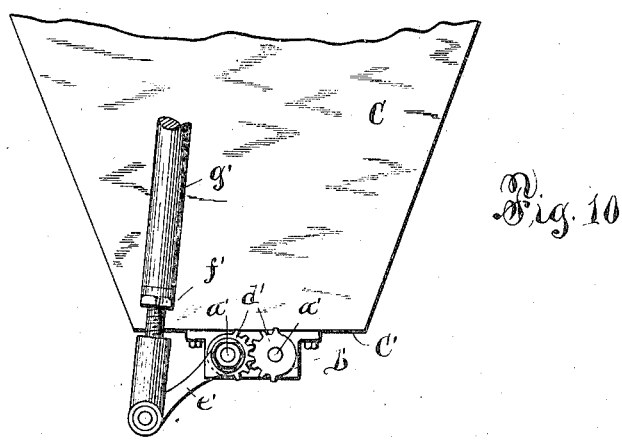
WITNESSES:
J. J. Laass.
H. B. Smith.
INVENTOR
Joseph C. Walier
By E. Laass
his ATTORNEY

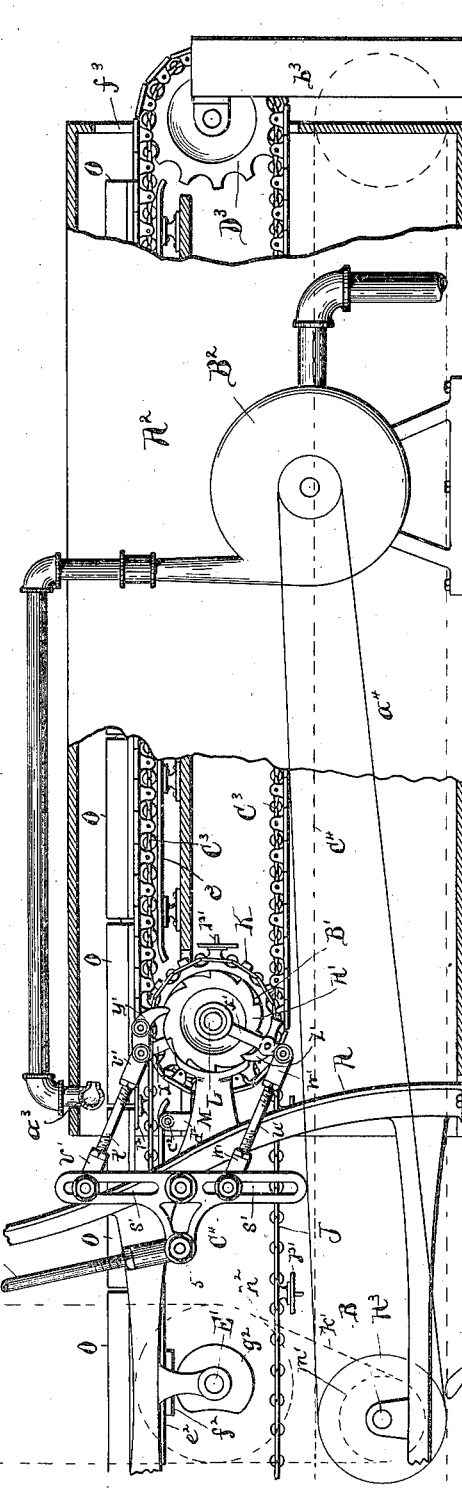

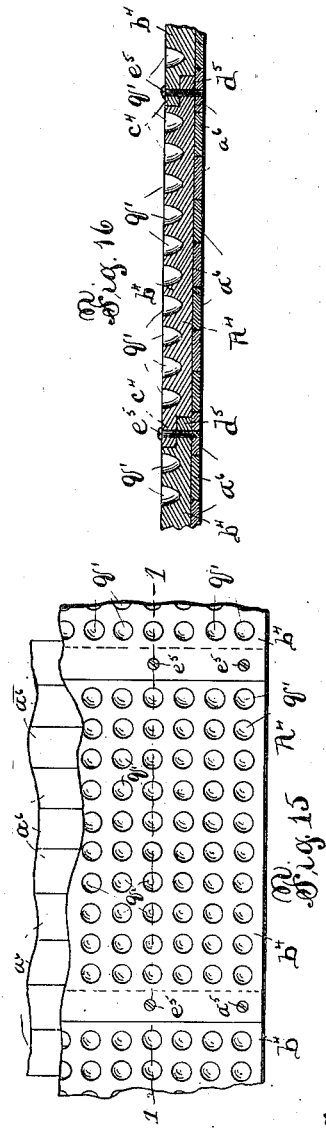
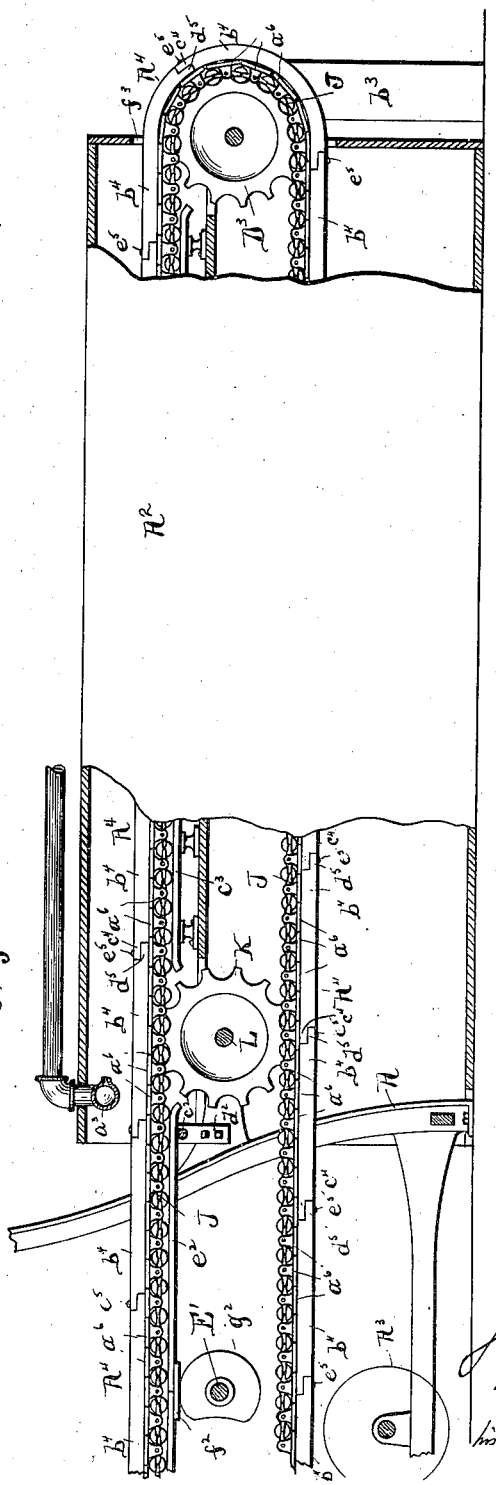

UNITED STATES PATENT OFFICE.

JOSEPH CASPER WALIER, OF SYRACUSE, NEW YORK.

MACHINE FOR MOLDING CONFECTIONS.

SPECIFICATION forming part of Letters Patent No. 655,918, dated August 14, 1900.

Application filed January 27, 1899. Renewed June 28, 1900. Serial No. 21,979. (No model.)

*To all whom it may concern:*

Be it known that I, JOSEPH CASPER WA-LIER, a citizen of the United States, and a resident of Syracuse, in the county of Onondaga, in the State of New York, have invented new and useful Improvements in Machines for Molding Confections, of which the following, taken in connection with the accompanying drawings, is a full, clear, and exact description.

This invention relates to improvements in machines for molding confections; and it has special reference to the machine shown and described in my United States Patent No. 524,097, issued August 7, 1894, in which patent the machine comprises a hopper for containing the confection material to be molded and provided with discharge-openings in its bottom, valves and plungers controlling the discharge of the confection material through said openings, and trays carried upon a conveyer below the hopper and provided with molds, into which the material is deposited.

The objects of my invention are to provide more efficient, positive, and reliable means for operating the aforesaid plungers and valves and also to provide simple and efficient mechanism for automatically and intermittently moving the conveyer to bring the rows of molds provided in the trays successively under the aforesaid discharge-openings.

It has been found in practice that at each discharge of the confection material from the hopper there is a tendency to leave a string of the material between the molds and the discharge-openings. Therefore another object of my invention resides in providing means whereby the aforesaid string is broken before the tray is shifted, and thereby cause the string to drop into the mold, which would otherwise be strewn between the molds.

My present invention consists, first and essentially, in the combination, with the main frame, main driving-shaft, a hopper for containing the confection material and provided with discharge-openings in its bottom, cut-off valves, plungers, and oscillatory discharge-valves controlling the discharge of the confection material from the hopper, of a conveyer consisting, preferably, of endless chains below the hopper, trays carried on the conveyer and each provided with a plurality of rows of molds, a double or duplex ratchet mechanism connected to the conveyer and having a primary actuation by which the conveyer is moved intermittently to bring the rows of molds of each tray successively under the aforesaid discharge-openings, and a secondary actuation, which is timed to impart a single and greater movement to the conveyer at regular intervals to bring the first row of molds of each succeeding tray under said openings, and means transmitting motions from the main driving-shaft to the aforesaid ratchet mechanism and valves and plungers, respectively.

The invention also consists, in combination with the main driving-shaft and conveyer-chains, of longitudinal flexible bars supporting the portion of the chains below the hopper, cams mounted on a shaft below the chains, upon which cams the aforesaid bars rest, said cams being timed in their movement to drop and raise the conveyer with the tray immediately after each discharge from the hopper to break the string of confection material formed between the discharge-opening and mold incident to each discharge, as hereinbefore stated, and means transmitting motion from the main driving-shaft to the cam-shaft.

The invention also consists in the novel details of construction, as hereinafter fully described, and specifically set forth in the claims.

Figure 3:
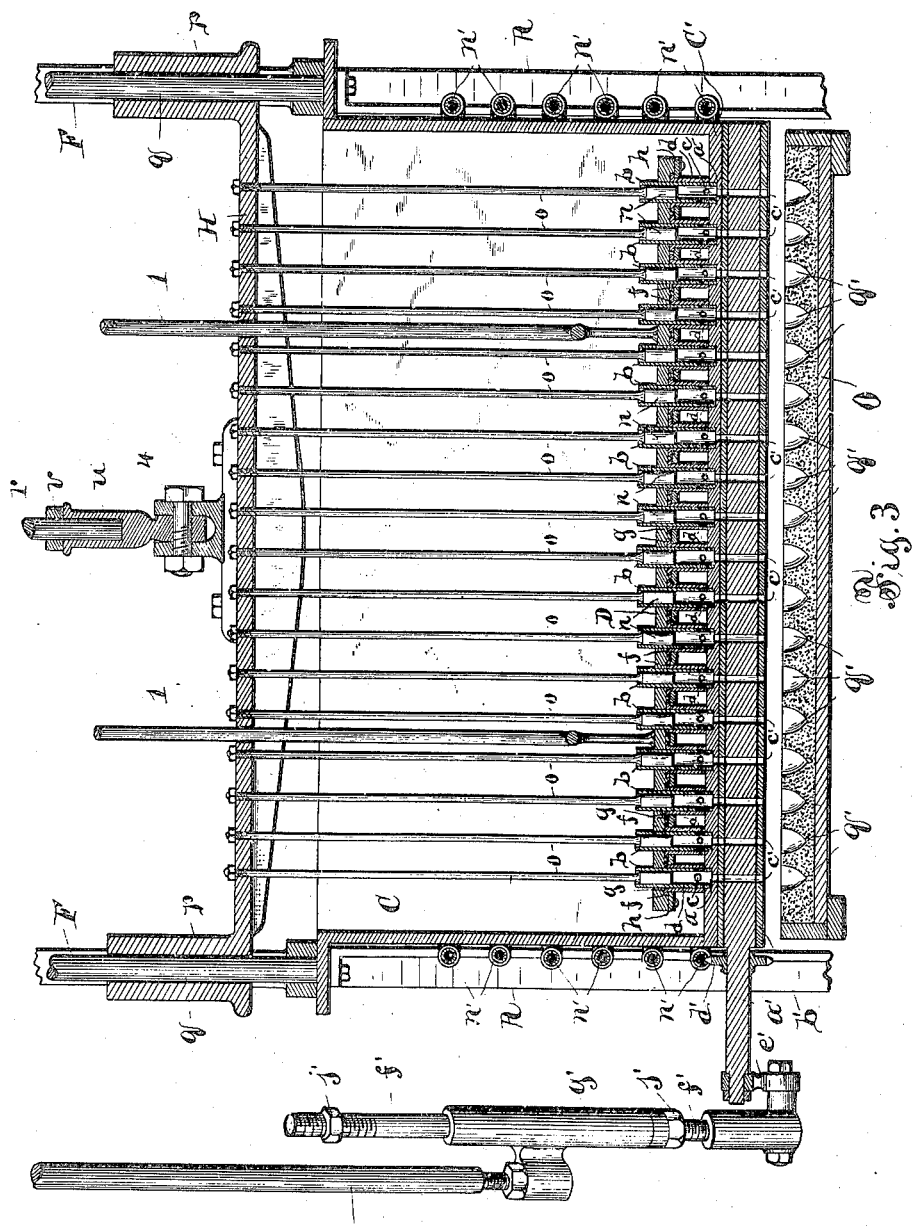
Figure 4:
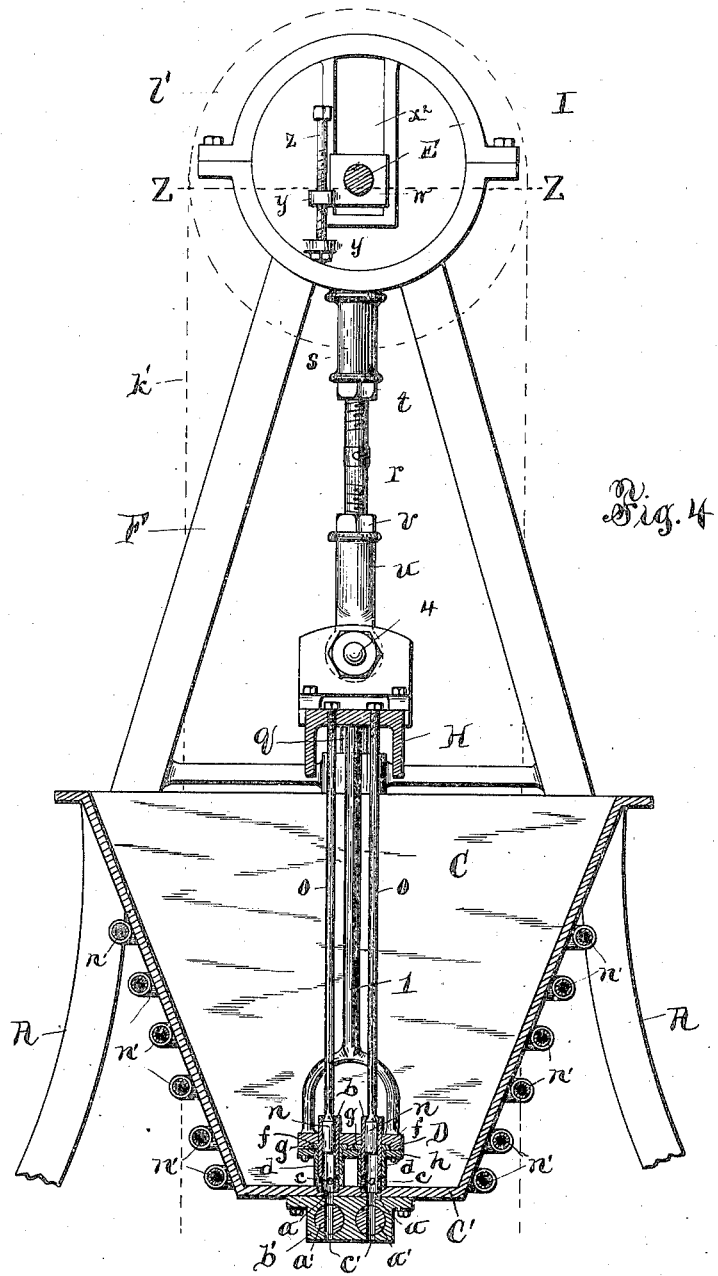
Figure 12:
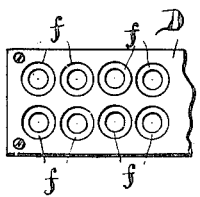
Figure 5:
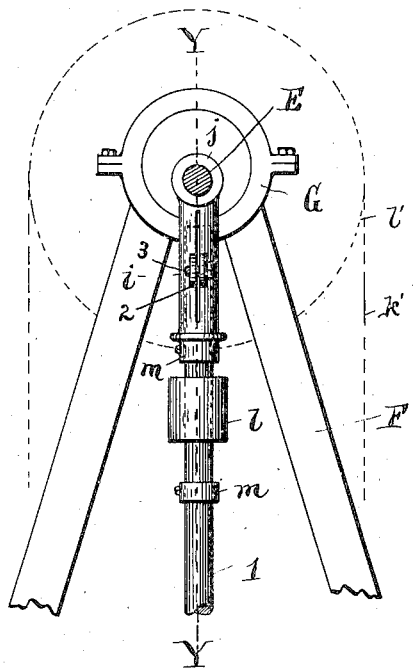
Figure 6:
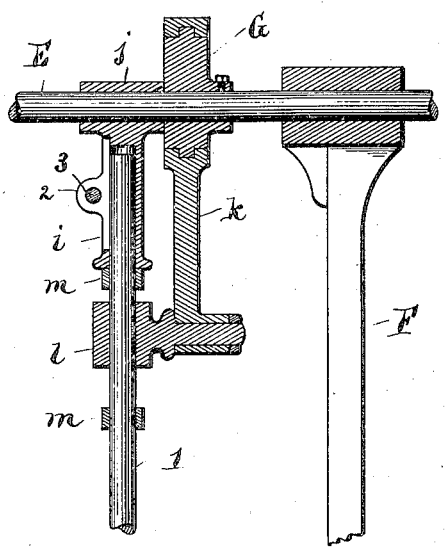

In the annexed drawings, Figure 1 is a side elevation of my improved confection-molding machine. Fig. 2 is a front or end elevation of the same. Fig. 3 is an enlarged vertical transverse section on line V V in Fig. 1. Fig. 4 is an enlarged vertical longitudinal section on line W W in Fig. 2. Fig. 5 is an enlarged vertical longitudinal section on line X X in Fig. 2. Fig. 6 is a vertical transverse section on line Y Y in Fig. 5. Fig. 7 is a further enlarged detail transverse section illustrating more clearly the cut-off valves, plungers, and discharge-valves which control the discharge of confection material from the hopper. Fig. 8 is also a further enlarged horizontal transverse section on line Z Z in Fig. 4. Fig. 9 is an enlarged detail side view of the double or duplex ratchet mechanism which intermittently moves the conveyer. Fig. 10 is an enlarged detail end view of a portion of the hopper, illustrating the connection between the oscillatory discharge-valves. Fig. 11 is a detail side view of the cam mechanism which drops and raises the conveyer. Fig. 12 is an inverted plan view of a portion of the bar which carries the cut-off valves. Fig. 13 illustrates the cooling apparatus used in connection with my improved confection-molding machine, which apparatus is partly shown in section. Fig. 14 is partly a longitudinal section of the cold-air box and a portion of the molding-machine, illustrating a modification of the conveyer and molds. Fig. 15 is an enlarged detail plan view of a portion of a carrier mounted on the conveyer and provided with molds. Fig. 16 is a longitudinal transverse section on lines 1 1 in Fig. 15.

Referring to the drawings, A represents the main frame of the machine, which frame may be of any suitable construction or design, and B denotes the main driving-shaft journaled on the lower part of the frame.

Upon the frame A is supported the hopper C for containing the confection material to be molded, which hopper is provided in its bottom C' with a plurality of discharge-openings $a\ a$. Extending upward from said openings are gage-tubes $b\ b$. Said tubes are screw-threaded externally at their lower ends and are thereby secured to the bottom C' and they are provided with ports $c\ c$ in their sides. Over said tubes slide telescopically cut-off valves $d\ d$, consisting of tubes which are secured at their upper ends to a vertically-movable horizontal bar D. I preferably attach said valves to the bar by providing annular recesses $f\ f$ in the under side of the bar and form each of said valves with a flange $g$ at its upper end, which flanges are seated in the recesses, and to the under side of the bar is secured a plate $h$ to retain the flanges therein.

To the upper side of the bar D are connected two pitmen 1 1, which are secured vertically movable at their upper ends in friction-sleeves $i\ i$, provided with journals $j\ j$, by which said sleeves are suspended from a shaft E, journaled on an auxiliary frame F, which latter frame is supported on the hopper C. The sleeve $i$ is split longitudinally and formed with ears 2 2, through which ears a screw 3 passes, whereby the sleeve can be compressed more or less to regulate its frictional hold on the pitmen 1.

The pitmen 1 1 receive intermittent reciprocating motion from eccentrics G G, mounted on the shaft E, and each provided with a downwardly-extending arm $k$, to the lower end of each of which arms is pivoted a coupling-eye $l$, sliding on the pitmen 1 and engaging two stops $m\ m$, secured to the pitmen, whereby the bar D is raised and lowered, and thus the cut-off valves $d\ d$, carried thereon, are caused to open and close the ports $c\ c$ in the gage-tubes $b\ b$. There is a lost motion between the coupling-eye $l$ and the stops $m\ m$, whereby the valves $d\ d$ are properly timed in their operation. Said stops are secured longitudinally adjustable on the pitmen 1 1, whereby the stroke of the pitmen can be regulated.

In the gage-tubes $b\ b$ are the plungers $n\ n$ for forcing the confection material through the openings $a\ a$ in the bottom of the hopper, which plungers are provided with stems $o\ o$, secured at their upper ends to a vertically-movable horizontal frame H, provided at its ends with journals $p\ p$, by which it slides on guide-rods $q\ q$, secured to the auxiliary frame F.

The frame H receives reciprocating motion from the shaft E by means of an eccentric I, mounted on said shaft and connected to the frame H by means of a rod $r$, provided with a right and left thread and secured at its upper end to a coupling $s$, formed integral with the eccentric I and provided with a set-nut $t$, which rod is secured at its lower end to a coupling $u$, pivoted to the top of the frame H, as shown at 4, and provided with a nut $v$. The eccentric I is provided with a journal-box $w$, which is radially adjustable in a guide $x^2$, formed in the eccentric, and on the box and eccentric are provided two screw-threaded ears $y\ y$, through which ears passes a screw $z$, by which to adjust said box, whereby the stroke of the plungers can be lengthened or shortened and the supply of confection material forced through the discharge-openings $a\ a$ correspondingly increased or diminished. By loosening the aforesaid nuts $t$ and $v$ the rod $r$ can be turned, whereby the frame is adjusted vertically.

I prefer to provide two sets or rows of plungers and cut-off valves, although I do not limit myself in this respect, as more or less may be employed.

Below the discharge-openings $a\ a$ are located the two oscillatory discharge-valves $a'\ a'$, which valves consist of two shafts journaled in a casing $b'$, secured to the under side of the hopper C and provided with transverse ports $c'\ c'$, communicating with the aforesaid openings $a\ a$. Said discharge-valves are connected, so as to move in unison, by means of two mutilated gears $d'\ d'$, secured to the valves, as clearly shown in Fig. 10 of the drawings, and are oscillated by means of a lever $e'$, rigidly secured on one end to one of the valves and pivoted at its opposite end to an upwardly-projecting stem $f'$, on which slides the sleeve $g'$, connected to the lower end of a pitman $h'$, which pitman is pivoted at its upper end to a disk $i'$, secured to the eccentric-shaft E. The stem $f'$ is screw-threaded at its end portions and is provided with nuts $j'\ j'$, which serve as stops, which are engaged by the sliding sleeve $g'$, with a lost motion between them, said lost motion being employed for the purpose of properly timing the movement of the discharge-valves $a'\ a'$ in conjunction with the movement of the plungers $n\ n$, as hereinafter explained.

The shaft E derives its motion from the main driving-shaft B, preferably by means of a sprocket-chain $k'$, traveling on two sprocket-wheels $l'$ and $m'$, secured to the shafts E and B, respectively.

The hopper C is heated preferably by means of steam or hot-water pipes $n'$ $n'$, which surround the hopper for the purpose of maintaining the confection material in the hopper in proper condition for being molded, although any other suitable system for heating the same may be employed.

J J denote a pair of endless sprocket-chains, which constitute the main conveyer. Said chains travel on sprocket-wheels K K, mounted on shafts L L, which shafts are journaled in boxes $o'$ $o'$, secured longitudinally adjustable on extensions M M, provided on the front and rear ends of the main frame A. Said adjustment serves to regulate the tension of the chains in the well-known manner.

The chains J J are provided at regular intervals throughout their length with horizontal plates $p'$ $p'$, upon which are supported the trays O O, provided with a plurality of rows of molds $q'$ $q'$ to receive the discharges from the hopper, as will be shortly explained.

The chains J J have a primary or intermittent movement whereby the molds of each tray are brought successively under the discharge-openings $a$ $a$ and also a secondary or single and greater movement whereby the tray is moved to bring the first two rows of molds of each succeeding tray under the aforesaid opening, which movements are imparted by my improved double or duplex ratchet mechanism, which I will now describe. To one of the shafts L, preferably the shaft at the front end of the machine, are rigidly secured a primary ratchet-wheel A' and a secondary ratchet-wheel B', which ratchet-wheels are detachably secured together by means of a screw or bolt $r'$. To the frame A is pivoted a vertically-disposed rock-arm C$^4$, provided with two longitudinal slots $s'$ $s'$ on opposite sides of the pivot.

$t'$ and $u'$ denote an upper and lower pitman, respectively, which pitmen are screw-threaded at their ends and provided thereat with couplings $v'$ $v'$ and $w'$ $w'$, respectively. The rear couplings are pivotally secured in the aforesaid slots $s'$ $s'$ of the rock-arm C$^4$ and the front couplings are pivotally secured to the outer or free ends of arms $x$ $x'$, respectively, which arms are mounted loosely at their opposite ends on the aforesaid shaft L. To the front coupling $v'$ of the pitman $t'$ is pivoted a pawl $y'$, which engages the secondary ratchet-wheel B', and to the arm $x'$, adjacent to the coupling $w'$ of the pitman $u'$, is pivoted a similar pawl $z'$, which engages the primary ratchet-wheel A'. The rock-arm C$^4$ is operated by means of a pitman $a^2$, connected at its lower end to said arm, as shown at 5, and at its upper end to an eccentric C$^2$, mounted on the shaft E, which receives motion from the main driving-shaft A, as aforesaid. The primary ratchet-wheel A' is provided with consecutive teeth $b^2$ $b^2$, whereby it is actuated by the pawl $z'$ at each thrust of the pitman $u'$, whereby the conveyer-chains J J are moved intermittently until all the rows of molds $q'$ $q'$ in each tray have been brought under the aforesaid openings, at which time the secondary ratchet-wheel B', provided with two teeth $b^4$ $b^4$, arranged equally distant apart, is engaged by the pawl $y'$, actuated by the pitman $t'$, which has a greater thrust than the pitman $u'$, whereby the aforesaid chains are given a single and greater movement to bring the first two rows of molds of each succeeding tray O under the discharge-openings $a$ $a$. The thrusts of the pitmen $t'$ and $u'$ can be shortened or lengthened to move the chains a corresponding greater or less distance by shifting the rear couplings $v'$ $w'$ in the slots $s'$ $s'$, provided in the rock-arm C$^4$, which rock-arm is so timed in its movement as to actuate the ratchet mechanism, and thus shift the chains J J between each closing and opening of the discharge-valves $a'$ $a'$.

Extending transversely across the main frame A are two rods $c^2$ $c^2$, preferably supported on brackets $d^2$ $d^2$, secured to the extensions M M of the frame, and upon said rods are supported the ends of two longitudinal bars $e^2$ $e^2$, upon which bars the intermediate portion of the chains J J, below the hopper C, are supported. Said bars are preferably divided intermediate their lengths and connected thereat by a flexible plate $f^2$, whereby they will yield under the weight of said chains, as will be shortly explained. Below the bars $e^2$ $e^2$ extends a transverse shaft E', journaled on the main frame A, upon which shaft are mounted two cams $g^2$ $g^2$, upon which cams the aforesaid bars rest, said cams serving to allow the bars to yield as aforesaid and to raise the same, thereby lowering and lifting the chains J J, whereby the string of confection material formed between the discharge-valves $a'$ $a'$ and molds $q'$ $q'$ after each discharge from the hopper will be broken, as hereinbefore stated.

The cam-shaft E' is provided with a sprocket-wheel $h^2$, which engages the sprocket-chain $k'$, whereby it receives motion from the main driving-shaft B.

Referring to Fig. 13 of the drawings, illustrating the apparatus employed in connection with my improved molding-machine for cooling the molded material, A$^2$ represents a suitably-supported box arranged at the front end of the machine, which box is supplied with cold air, preferably by means of a rotary blower B$^2$, communicating with the box, as shown at $a^3$, said blower being furnished with cold air from any suitable ice-chamber or other source. (Not necessary to be shown.) Said blower is preferably driven, by means of a belt $a^4$, from the main driving-shaft B. Through the box A$^2$ extend supplemental conveyer-chains C$^3$ C$^3$, provided with transverse boards $a^6$ and carried on the sprocket-wheels D$^3$ D$^3$, journaled on a support $b^3$ at the front end of the box A² and on rear sprocket-wheels mounted on the shaft L, (not necessary to be shown in detail,) whereby the latter conveyer-chains receive their movements. In the box I prefer to provide tracks $c^3 c^3$, upon which the chains $C^3 C^3$ ride. The supplemental conveyer is arranged in the same plane as the main conveyer, whereby it will receive the trays O O, containing the molded material, and carry said trays into the box A², whereby the material will be cooled as aforesaid. The front end of the box A² is provided with an opening $f^3$ of sufficient size to permit the removal of the trays O O. I do not wish to limit myself to the particular construction of the cooling apparatus herein shown and described, as the same is subject to many modifications, or any other suitable means may be employed for the purpose.

The operation of my improved confection-molding machine is as follows: The conveyer-chains J J are first adjusted to bring the first tray O, with its first two rows of molds $q' q'$, under the discharge-openings $a a$ in the bottom of the hopper C. The discharge-valves $a' a'$ being closed, the cut-off valves $d d$ raised to open the ports $e c$, and the confection material deposited in the hopper C, the driving-pulley $A^3$ is thrown in connection with the main driving-shaft A by any suitable or well-known clutch mechanism in the usual and well-known manner, (not shown,) and motion is transmitted to the shaft E by the sprocket-wheels $l'$ and $m'$ and their connecting sprocket-chain $k'$, and by means of the eccentric I, mounted on the latter shaft, the plunger-carrying frame is lifted, whereby the plungers $n n$ are raised, thereby causing a suction, by which the confection material is drawn through the ports $c c$ into the gage-tubes $b b$. When the plungers have reached the end of their upward stroke, the bar D is forced downward by means of the eccentrics G G and their connecting pitmen 1 1, whereby the cut-off valves carried on said bar are caused to close the ports $c c$. While said valves are in their closed position, the oscillatory discharge-valves $a' a'$ are opened by means of the disk $i'$, secured to the shaft E, and its connecting-pitman $h'$, and immediately thereafter the plungers $n n$ are pushed down, whereby the confection material is forced out of the tubes $b b$, from whence the material drops into the molds $q' q'$, contained in the tray O. The discharge-valves $a' a'$ are then closed. The lost motions provided for the pitmen $l l$ and the pitmen $h'$ serve to properly time the movement of the cut-off valve and discharge-valve, as hereinbefore described. Immediately after the confection material is deposited in the molds and the discharge-valves are closed the conveyer-chains J J, carrying the trays O O, are given a sudden drop by the cams $g^2 g^2$, whereby the string of material usually left between the molds and discharge-valves is broken and caused to drop in said molds. The cam-shaft E' and eccentric-shaft E being in the same gear with the main driving-shaft B, it will be seen that the cams are so timed in their movement as to drop and lift the conveyer-chains J J after each discharge of the material from the hopper. Immediately after the chains J J are raised or lifted by the cams they are shifted to bring the two succeeding rows of the tray O under the discharge-openings of the hopper by the primary ratchet-wheel A', which is moved by the pawl $z'$, actuated by the rock-arm $C^4$, connected to the eccentric $C^2$. The operation of said ratchet-wheel is repeated after each discharge from the hopper until the last two rows of molds $q' q'$ in the tray are filled, at which time one of the teeth $b^4$ of the secondary ratchet-wheel B' is brought into position to be engaged by the pawl $y'$, and thereby given a single and greater movement by reason of greater thrust of the pitman $t'$, as aforesaid, whereby the chains J J are shifted sufficiently to bring the first two rows of molds $q' q'$ of the succeeding tray O under the discharge-openings of the hopper, after which the aforesaid actions of the valves and plungers and the cam mechanisms are repeated in the manner hereinbefore described. When the trays reach the front end of the machine, they are received by the supplemental conveyer-chains $C^3 C^3$, and thereby carried through the cold-air box A², whereby the molded material is cooled. When the trays have reached the front end of the box A², they are taken from the conveyer and the molded material removed. The trays are then placed upon a third conveyer $C^5$, which carries the trays back to the rear end of the molding-machine, and is preferably operated by the main driving-shaft B, which latter conveyer is indicated by dotted lines and is unnecessary to be shown in detail, as the same may be of any suitable and well-known construction.

Referring to Figs. 14, 15, and 16 of the drawings, illustrating a modification of the conveyer and mold-tray, the endless conveyer-chains extend from the rear end of the molding-machine to the front end of the cold-air box and through the same and are carried on the sprocket-wheels K K and $D^3 D^3$. In this case the chains are constructed similar or like the auxiliary conveyer-chains $C^3 C^3$—i. e., they are provided with the transverse boards $a^6 a^6$, to which is secured a continuous flexible carrier $A^4$, composed of sections $b^4 b^4$, which sections are preferably formed at their respective meeting ends with an overlying lip $c^4$ and an underlying lip $d^5$, through which lips pass screws or bolts $e^5 e^5$, whereby said sections are detachably secured to the boards $a^6 a^6$, thus permitting the removal of said sections for the purpose of washing and cleaning the same when desired. It will be seen that by reason of the chains passing over the sprocket-wheels $D^3 D^3$ an inflexion is naturally produced in the carrier $A^4$, which inflexion causes the confection material to be loosened in the molds, whereby the same will drop out automatically.

What I claim as my invention is—

1. The combination with the main frame, main driving-shaft, and the hopper provided with discharge-openings in its bottom, of a conveyer below the hopper and carrying trays provided with molds, suitably-operated valves and plungers controlling the discharge from the hopper, a double or duplex ratchet mechanism imparting an intermittent and variable movement to the conveyer, a suitably-pivoted rock-arm, pitmen connecting said ratchet mechanism and rock-arm, an eccentric actuating said rock-arm, and mechanism transmitting motion from the main driving-shaft to said eccentric as set forth.

2. The combination with the main frame, main driving-shaft, and the hopper provided with discharge-openings in its bottom, of a conveyer below the hopper, molds carried on said conveyer, suitably-operated mechanism controlling the discharge from the hopper, mechanism dropping and raising the conveyer after each discharge, a double or duplex ratchet mechanism imparting an intermittent and variable movement to the conveyer, a suitably-pivoted rock-arm, pitmen connecting said ratchet mechanism and rock-arm, and means transmitting motion from the main driving-shaft to said rock-arm as set forth.

3. The combination with the hopper provided with discharge-openings in its bottom, endless chains or belts below the hopper, trays carried on said chains and provided with molds, longitudinal yielding bars supporting the intermediate portion of said chains, ratchet mechanism intermittently shifting said chains, suitably-operated cams dropping and raising said supporting-bars for the purpose set forth, valves and plungers controlling the discharge from the hopper, and means actuating said valves and plungers substantially as described and shown.

4. The combination with the main frame, main driving-shaft, and the hopper provided with discharge-openings in its bottom, tubes extending upward from said openings and provided with ports in their sides, plungers in said tubes, cut-off valves opening and closing said ports, oscillatory discharge-valves communicating with the aforesaid openings, means actuating the cut-off valves and plungers, meshing gears connecting said discharge-valves, an auxiliary shaft, a crank secured to the latter shaft, a lever secured to one of said gears, a pitman connecting said lever and crank, and means transmitting motion from the main driving-shaft to the auxiliary shaft as set forth.

5. The combination with the hopper provided with discharge-openings in its bottom, tubes extending upward from said openings and provided with ports in their sides, cut-off valves opening and closing said ports, plungers in said tubes, discharge-valves communicating with said openings, means for actuating said valves and plungers, a conveyer moving intermittently below the hopper, trays carried on said conveyer and provided with molds, mechanism operating said conveyer, and suitably-operated cams dropping and raising the conveyer for the purpose set forth.

6. The combination with the main frame, of two transverse shafts journaled at opposite ends of the frame, sprocket-wheels secured to said shafts, chains traveling on said sprocket-wheels, ratchet mechanism connected to one of said shafts to intermittently move said chains, means actuating said ratchet mechanism, yielding or flexible longitudinal bars secured to the frame and between the aforesaid sprocket-wheels, upon which bars the intermediate portion of the chains rest, a transverse shaft journaled on the frame and provided with two cams supporting the central portion of the aforesaid bars to drop and raise the same for the purpose set forth, and mechanism operating the cam-shaft, substantially as described.

7. The combination with the main frame and main driving-shaft, two shafts extending across the ends of the frame, sprocket-wheels secured to said shafts, chains traveling on said sprocket-wheels, ratchet mechanism intermittently moving said chains, a transverse rod extending across each end of the frame, two longitudinal centrally-divided yielding or flexible bars supported at their ends on said rods, a plate uniting two sections of each bar, a transverse shaft extending below said bars, cams secured to the latter shaft upon which cams the aforesaid plates rest to drop and raise said bars, for the purpose set forth, and mechanism transmitting motion from the main driving-shaft to the ratchet mechanism and cam-shaft respectively as described.

8. The combination with the conveyer, of a primary ratchet-wheel connected thereto, a pawl engaging said ratchet-wheel to impart successive intermittent movements to the conveyer, a secondary ratchet-wheel also connected to the conveyer and rigidly attached to the primary ratchet-wheel, a pawl engaging the secondary ratchet-wheel to impart a single and greater movement to the conveyer, pitmen connected to said pawls, a rock-arm actuating said pitmen, and mechanism operating said rock-arm as set forth.

9. The combination with the main frame, main driving-shaft and conveyer, a double or duplex ratchet mechanism imparting an intermittent and variable movement to the conveyer, a suitable pivoted rock-arm, pitmen connecting said ratchet mechanism and rock-arm, an eccentric actuating said rock-arm, and mechanism transmitting motion from the main driving-shaft to said eccentric as set forth.

10. The combination with the main frame, main driving-shaft, and the hopper provided with discharge-openings in its bottom, plungers, cut-off valves, and oscillatory discharge-valves controlling the discharge from the hopper, an intermittently-moving conveyer below said hopper, trays carried on said conveyer and provided with a plurality of molds, a shaft journaled above the hopper, a vertically-movable horizontal frame carrying the plungers, a vertically-movable horizontal bar carrying the cut-off valves, meshing gears secured to the aforesaid oscillatory valves, a lever attached to one of the latter valves, a pair of eccentrics mounted on the upper shaft, pitmen connecting said eccentrics and aforesaid bar, a third eccentric mounted on said shaft, a rod connecting the latter eccentric and plunger-carrying frame, a disk or crank secured to said eccentric-shaft, a pitman connecting said disk and aforesaid lever, sprocket-wheels secured to the eccentric-shaft and main driving-shaft respectively, and a sprocket-chain connecting said sprocket-wheels as set forth.

11. The combination with the main frame, main driving-shaft, and the hopper provided with discharge-openings in its bottom, oscillatory discharge-valves communicating with said openings, meshing gears connecting said valves, a lever secured to one of said valves, a second shaft, a disk or crank mounted on the latter shaft, a pitman connecting said disk and lever, and means transmitting motion from the main driving-shaft to the other shaft as set forth.

12. The combination with the main frame, main driving-shaft, and the hopper provided with discharge-openings in its bottom, tubes extending upward from said openings and provided with ports in their sides, plungers in said tubes, a vertically-movable horizontal frame carrying said plungers, cut-off valves sliding telescopically over said tubes to open and close said ports, a vertically-movable horizontal bar carrying said cut-off valves, oscillatory discharge-valves communicating with said openings, meshing gears connecting said oscillatory valves, a lever secured to one of the latter valves, a shaft journaled above the hopper, a pair of eccentrics mounted on the latter shaft, pitmen connecting said eccentrics and the aforesaid bar, a third eccentric mounted on the latter shaft, a rod connecting the latter eccentric and plunger carrying frame, a disk or crank secured to said eccentric-shaft, a pitman connecting said disk or crank and the aforesaid lever, a sprocket-wheel secured to each of said shafts, and a sprocket-chain connecting said sprocket-wheels as set forth.

13. The combination with the main frame, main driving-shaft, and the hopper provided with discharge-openings in its bottom, valves and plungers controlling the discharge from the hopper, mechanism operating said valves and plungers, endless chains or belts moving intermittently below the hopper, ratchet mechanism operating said chains, a rock-arm pivoted to the frame, a pitman connected to said rock-arm and actuating said ratchet mechanism, longitudinal yielding or flexible bars supporting the intermediate portion of said chains, a transverse shaft below said bars and provided with cams upon which said bars rest for the purpose set forth, a shaft journaled above the hopper, an eccentric mounted on the said latter shaft, a pitman connecting said eccentric and aforesaid rock-arm, sprocket-wheels mounted on the main driving-shaft and eccentric-shaft, a sprocket-chain connecting said sprocket-wheels, and a sprocket-wheel mounted on the cam-shaft and engaging said sprocket-chain as set forth.

14. The combination with the main frame, main driving-shaft, and the hopper provided with discharge-openings in its bottom, suitably-operated discharge-valves communicating with said openings, tubes extending upward from the openings and provided with ports in their sides, cut-off valves sliding telescopically on said tubes to open and close said ports, a vertically-movable horizontal bar carrying said latter valves, plungers in said tubes, a vertically-movable horizontal frame carrying said plungers and provided with vertical guides, a shaft supported above the hopper, a pair of eccentrics mounted on the latter shaft, pitmen connecting said eccentrics and valve-carrying bar, and passing through the aforesaid guides, a third eccentric mounted on the latter shaft, a rod connecting the latter eccentric and plunger-carrying frame, and mechanism transmitting motion from the main driving-shaft to the eccentric-shaft as set forth.

15. The combination with the main frame, main driving-shaft, and the hopper provided with discharge-openings in its bottom, oscillatory discharge-valves communicating with said openings, a lever secured to one of said valves, an upwardly-projecting stem pivotally connected to said lever and provided with a pair of adjustable stops, a sleeve sliding on said stem and engaging the said stops with a lost motion between the same, a shaft journaled above the hopper, a disk or crank secured to the latter shaft, a pitman secured at its upper end pivotally to said disk or crank, and at its lower end to the aforesaid sleeve, and means transmitting motion from the main driving-shaft to the other shaft as set forth.

16. The combination with the main frame, main driving-shaft, and the hopper provided with discharge-openings in its bottom, tubes extending upward from said openings and provided with ports in their sides, plungers in said tubes, discharge-valves communicating with said openings, mechanism operating said plungers and discharge-valves, cut-off valves sliding telescopically on said tubes to open and close said ports, a vertically-movable horizontal bar carrying said cut-off valves, a shaft journaled above the hopper, an eccentric mounted on the latter shaft and provided with a downwardly-extending arm, a longitudinally-split friction-sleeve hung from the eccentric-shaft, a pitman secured at its lower end to the aforesaid bar and at its upper end vertically movable in said sleeve, adjustable stops on said pitman, a coupling pivoted to the eccentric-arm and sliding on said pitman to engage said stops with a lost motion between the same, and means transmitting motion from the main driving-shaft to the eccentric-shaft as set forth.

17. The combination with the main frame, and main driving-shaft, two transverse shafts journaled on opposite ends of the frame, sprocket-wheels secured to said shafts, a pair of endless sprocket-chains carried on said sprocket-wheels, a primary ratchet-wheel and a secondary ratchet-wheel mounted on one of the latter shafts, a longitudinally-slotted vertically-disposed rock-arm pivoted intermediate its length to the main frame, an upper and a lower pitman, said upper pitman having a greater thrust than the lower pitman, and each pivoted adjustably at its rear end to said rock-arm and at its front end to the free end of an arm, which latter arm is mounted loosely at its opposite end on said latter shaft, a pawl carried on the front end of the lower pitman and engaging the primary ratchet-wheel to impart a plurality of successive intermittent movements to the sprocket-chains, a similar pawl carried on the front end of the upper pitman, the secondary ratchet-wheel being timed to bring one of its teeth into position at regular intervals to be engaged by the latter pawl, whereby a greater and single movement is imparted to the chains, a suitably-journaled shaft having an eccentric mounted thereon, a pitman connecting said eccentric and rock-arm, and means transmitting motion from the main driving-shaft to the eccentric-shaft as set forth.

18. The combination with a suitably-journaled shaft, of an eccentric provided with a radial guide, a journal-box movable longitudinally in said guide, screw-threaded ears formed on the journal-box and eccentric respectively, and a screw passing through said ears to shift said box as and for the purpose set forth.

19. The combination with the endless conveyer-chains provided with transverse boards, of a continuous flexible sectional carrier supported on said boards, and provided with molds, the sections thereof being formed with an overlying lip and underlying lip at their respective meeting ends, and screws or bolts passing through said lips and boards substantially as described and shown.

JOSEPH CASPER WALIER.

In presence of—
 J. J. LAASS,
 H. B. SMITH.